United States Patent
Wright et al.

(10) Patent No.: US 10,105,885 B2
(45) Date of Patent: *Oct. 23, 2018

(54) TWO-LAYERED INJECTION MOLDED FIELD JOINT FOR PIPELINE APPLICATIONS

(71) Applicant: SHAWCOR LTD., Toronto (CA)

(72) Inventors: Adam Robert Wright, Ellon (GB); Ole Thomas Ustad, Orkanger (NO); Suresh Choudhary, Singapore (SG)

(73) Assignee: Shawcor Ltd., Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/354,245

(22) Filed: Nov. 17, 2016

(65) Prior Publication Data

US 2017/0066165 A1 Mar. 9, 2017

Related U.S. Application Data

(63) Continuation of application No. PCT/CA2016/050049, filed on Jan. 22, 2016.

(Continued)

(51) Int. Cl.
*B29C 45/14* (2006.01)
*F16L 58/18* (2006.01)
(Continued)

(52) U.S. Cl.
CPC .. *B29C 45/14614* (2013.01); *B29C 45/14491* (2013.01); *B29C 45/1671* (2013.01); *B29C 66/5221* (2013.01); *F16L 58/181* (2013.01); *F16L 59/20* (2013.01); *B29C 45/14598* (2013.01); *B29K 2023/12* (2013.01); *B29K 2063/00* (2013.01); *B29K 2075/00* (2013.01); *B29K 2105/20* (2013.01);
(Continued)

(58) Field of Classification Search
CPC .......... B29C 45/14614; B29C 45/1671; B29C 45/14491; B29C 66/5221; F16L 59/20; F16L 58/181
See application file for complete search history.

(56) References Cited

U.S. PATENT DOCUMENTS 5,662,974 A 9/1997 Andrenacci et al.
2011/0297316 A1 12/2011 Jackson et al.
(Continued)

FOREIGN PATENT DOCUMENTS

WO WO 98/01697 * 1/1998
WO 2009027686 A1 3/2009

OTHER PUBLICATIONS

PCT Search Report (PCT/CA2016/050049), dated Apr. 14, 2016.

*Primary Examiner* — Mathieu D Vargot
(74) *Attorney, Agent, or Firm* — Gregory L. Porter; Hunton Andrews Kurth LLP

(57) ABSTRACT

A method of coating a field joint and a coated field joint formed thereby. The field joint coating includes a first thermal insulation material injection molded over the uncoated field joint to form a first layer, and a second thermal insulation material injection molded over the first layer to form a second layer. The second material has a greater flexibility than the first material and a lower maximum operating temperature than the first material. In certain embodiments, the second material forms a significant part of the volume of the field joint coating.

14 Claims, 5 Drawing Sheets

Related U.S. Application Data

(60) Provisional application No. 62/106,891, filed on Jan. 23, 2015.

(51) Int. Cl.
  | | |
  |---|---|
  | *F16L 59/20* | (2006.01) |
  | *B29C 45/16* | (2006.01) |
  | *B29C 65/00* | (2006.01) |
  | *B29K 23/00* | (2006.01) |
  | *B29K 63/00* | (2006.01) |
  | *B29K 75/00* | (2006.01) |
  | *B29K 105/20* | (2006.01) |
  | *B29L 23/00* | (2006.01) |

(52) U.S. Cl.
  CPC ................. *B29K 2995/0015* (2013.01); *B29K 2995/0078* (2013.01); *B29L 2023/22* (2013.01)

(56) References Cited

U.S. PATENT DOCUMENTS

| | | |
|---|---|---|
| 2012/0090765 A1 | 4/2012 | Tailor et al. |
| 2013/0170913 A1 | 7/2013 | Hoffmann |
| 2015/0041017 A1* | 2/2015 | Hegdal ................. F16L 58/181 138/145 |

* cited by examiner

TWO-LAYERED INJECTION MOLDED FIELD JOINT FOR PIPELINE APPLICATIONS

CROSS REFERENCE

This application is a continuation of PCT/CA2016/050049, filed Jan. 22, 2016, which claims benefit of U.S. Provisional Patent Application No. 62/106,891, filed Jan. 23, 2015. Both applications are incorporated by reference.

FIELD

The present disclosure is related to a method of coating a field joint for insulated pipelines, and pipelines having such coated field joints. The present disclosure may be relevant to onshore and/or offshore, oil and gas pipelines.

BACKGROUND

Typically, pipe sections which are factory-coated with a parent coating are not fully coated along their entire lengths, but rather are left with uncoated ends to facilitate joining of the pipe section ends (e.g., using a welding process) in the field. The pipe sections are typically welded together as part of the pipe laying process. This welding may take place at the location where the pipe sections are to be reeled, or, such as in the case of sub-sea or offshore pipes, on a lay barge or a reel ship.

Typically, after the field joint is formed, a mold is applied about the field joint and a coating material (usually an insulation material) is injected into the mold at pressure. The interface between the field joint coating and the parent coating may weaken due to flexing or bending of the field joint, and each separate material close to the interface is often the weakest link in the system, and may result in coating failures in this region during bending or flexing of the pipe, particularly in cases where the field joint coating comprises a material that is resistant to flexing, such as injection molded polypropylene.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
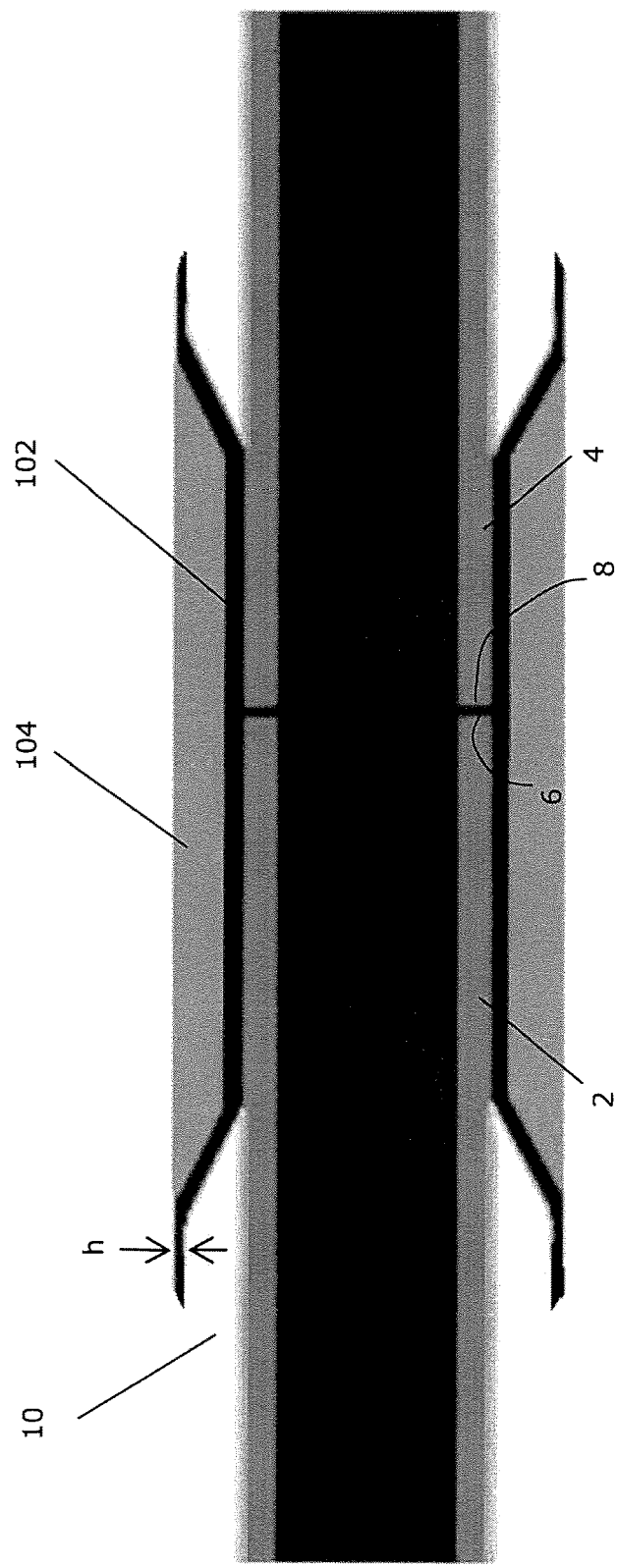
FIG. 1 shows a longitudinal cross-sectional view of an example coated field joint in accordance with an example of the present disclosure.

The coating material for the field joint may be chosen for its insulation and/or mechanical properties. A common insulation material that is injection molded over a field joint is polypropylene. However, injection molded polypropylene (IMPP) typically has a fairly high modulus (typically between 500-1000 MPa), which makes it resistant to bending and/or flexing. Since the pipe is typically transporting oil or gas at elevated temperatures, the outer surface of the uncoated pipe can reach temperatures in excess of 100° C. Lower modulus materials typically do not have sufficient temperature resistance for them to be suitable for use as the coating for the uncoated pipe.

Differences in the material qualities of the parent pipe and the field joint, combined with the stresses the parent coating is typically subjected to during the field joint application process (e.g. the temperatures experienced during the application and the thermal contraction forces the parent coating and field joint material are exposed to during the post application phase may result in stress concentrations in the interface between the two, and also in each material itself, close to the interface. This may result in disbondment or cracking failures in this region of the pipe, particularly during reeling of the pipeline.

It may also be desirable to reduce the upstand of the field joint coating, since the difference in outer diameter due to the field joint coating can cause damage to equipment during the pipe lay operation. An example configuration that reduces or avoids this upstand is described in U.S. Provisional Patent Application No. 62/065,151 entitled "Flush Field Joint" and filed Oct. 17, 2014, the entirety of which is hereby incorporated by reference. However, because this configuration may result in less overlap adhesion between the field joint coating and the outer surface of the parent coating, there may be a risk of disbondment or adhesion failure at the field joint coating/parent coating interface during bending when the field joint coating has low flexibility, as in the case of IMPP.

As well, application temperatures and the thermal contraction of the material as it is cooling down post application may result in internal stresses within the injected material, as the outer surfaces of the injected polypropylene will solidify while the core of the material is still cooling down and contracting. These stresses tend to accumulate within any weakness in the injected material, such as flowlines, air voids and interfaces with the parent coating. This problem may be more likely to be present for a large volume joint, since it will take longer to fill, creating more of these weak points and allowing the pre-heated parent coating more time to cool down during injection thus compromising the adhesion of the field joint coating to the parent coating.

In various examples, the present disclosure may address one or more of these challenges.

In some examples, the present disclosure provides a method of coating a field joint joining uncoated ends of two pipe sections, each pipe section being coating with a parent coating and having at least one uncoated end. The method may include injection molding a first layer of a reduced thickness thermal insulation coating covering the joined ends and a portion of the parent coating of each pipe section, comprising a material that can resist the design temperature of the pipeline, and injecting a second layer on top of the first layer comprising a material having a greater flexibility, but equal or better insulation properties than the first material. The second material may form a majority of the field joint coating, in volume.

In some examples, the present disclosure provides a coated field joint joining ends of two pipe sections. The coated field joint may include a field joint joining uncoated ends of the two pipe sections, each pipe section being coated with a parent coating and having at least one uncoated end;

and a field joint coating covering the field joint. The field joint coating may include a first layer of a reduced thickness thermal insulation coating covering at least the uncoated ends and a portion of the parent coating of each pipe section having a first material, and a second layer over the first layer, the second layer comprising a second material having a greater flexibility than the first material but equal or better insulation properties than the first material. The second layer may form a majority of the field joint coating, in volume.

The present disclosure provides a coated field joint in which the coating includes two layers. The first layer may comprise a first material to provide the field joint coating with a first set of properties (e.g., thermal insulation and water penetration barrier while being able to withstand the pipeline design temperatures) while the second layer may comprise a different second material to provide insulation properties equal or better than the first material but increased flexibility. In the present disclosure, the first layer refers to the layer in closest proximity to (e.g., adjacent to) the uncoated field joint and the second layer refers to the layer formed over the first layer.

Although the present disclosure describes two layers in the field joint coating, it should be understood that the field joint coating may be more generally a multi-layer field joint coating. For example, there may be an additional layer of primer or fusion bonded epoxy towards the steel and adhesive layers between any of the layers in the system to promote adhesion.

FIG. 1 shows a longitudinal cross-sectional view of an example coated field joint in accordance with an example of the present disclosure. In this example, two pipe sections 2, 4, are joined together at their respective uncoated ends 6, 8. For simplicity, the present disclosure will make reference to one pipe section 2, however it should be understood that both pipe sections 2, 4 may be substantially similar.

The pipe section 2 is provided with a parent coating 10, which may have been applied at a manufacturing site, such as a factory. The parent coating 10 may be any thermoplastic or thermosetting material. The parent coating 10 may be a multi-layered coating. For example, the parent coating 10 may include an inner anti-corrosion layer (e.g., a polyurethane or epoxy layer), a middle insulation layer (e.g., a foamed or unfoamed polypropylene layer) and an outer protective layer (e.g., an unfoamed polypropylene, polyurethane, epoxy resin or rubber layer). Different single-layered or multi-layered coatings may be used for the parent coating 10. For simplicity, the parent coating 10 is illustrated without showing different layers. The parent coating 10, as initially applied at the factory, may leave the end 6 of the pipe section 2 uncoated, for example about 200 mm from each end of the pipe section 2 may be free of the parent coating 10. The parent coating 10 may end abruptly or gradually (e.g., taper off) near the ends of the pipe section 2. The tapered end of the parent coating 10 may be formed at the manufacturing site, typically by machining or milling equipment or manually by grinders and/or planers or may be formed on site. This tapered end is referred to as the cut back. In FIG. 1, the pipe sections 2, 4 have different lengths of uncoated ends 6, 8 (longer in pipe section 2 than in pipe section 4), however in other examples the uncoated ends 6, 8 may be of the same or similar lengths.

The field joint is formed by joining (e.g., by welding) the uncoated ends 6, 8 of the pipe sections 2, 4. Initially, the pipe sections 2, 4 in the vicinity of the joint are uncoated. The joint may be coated by a field joint coating, as described below.

The field joint coating may comprise two layers 102, 104, which may each be formed by separate injection molding processes. The first layer 102 may comprise a first material different from a second material forming the second layer 104. The second layer 104 forms a significant part, for example, a majority, of the total volume of the field joint coating.

The first layer 102 may be formed from an insulation material selected for its thermal properties. For example, the outer surface of the pipe sections 2, 4 may be expected to have elevated temperatures (e.g., 100° C. or higher) and the material for the first layer 102 may be an insulation material that is selected to withstand such elevated temperatures. The first layer 102 may also completely seal the cutbacks forming the field joint preventing any space for water to flow to the uncoated ends of the pipe sections.

The second layer 104 may be formed from an insulation material selected for its insulation and flexibility properties. The material of the second layer 104 may have a maximum operating temperature less than the expected elevated temperature at the surface of the uncoated field joint and hence unsuitable for application immediately adjacent to the uncoated field joint. The material for the second layer 104 may be selected to provide the second layer 104 with greater flexibility (e.g., a modulus of less than 400 MPa) and comparable thermal characteristics to the first layer 102. The material for the second layer 104 may also be selected to satisfy other criteria for a field joint coating, such as a desired hardness and/or impact protection.

For example, the first layer 102 may be a foamed or unfoamed polypropylene material, including IMPP. A suitable example material for the second layer 104 may be a polyurethane material, including an epoxy-urethane hybrid material, such as the epoxy-modified polymer network NEMO™ 1.1 available from Bredero Shaw.

The first layer 102 may be relatively thin in order to increase the benefit of the greater flexibility and/or thermal insulation of the second layer 104, while still being of sufficient thickness such that the temperature at the outer surface of the first layer 102 is low enough to be within the operating temperature of the second layer 104. The first layer 102 may also be sufficiently thick to enable the first layer 102 to be formed by injection molding, since injection molding of a too-thin layer may be difficult and may result in incomplete filling of the field joint. In the example where the first layer 102 is formed by IMPP, a thickness of about 10 mm to 45 mm may be acceptable.

The first layer 102 may have substantially the same thickness throughout, with the exception of tapered ends as the first layer 102 reaches the outer surface of the parent coating 10, or may vary in thickness. In some examples, the first layer 102, in profile, may substantially match the profile of the exposed surfaces of the uncoated field joint (i.e., the uncoated ends of each pipe section 2, 4 and the cut backs of the parent coating 10 of each pipe section 2, 4). This may result in the first layer 102 having an approximate hourglass shape.

In the example of FIG. 1, the first layer 102 overlaps the outer surface of the parent coating 10, resulting in an upstand of height h (e.g., typically about 8-13 mm) over the parent coating 10. After the first layer 102 has been injection molded and completely or sufficiently cured, the second layer 104 may be injection molded overtop of the first layer 102 to fill in the majority of the field joint, resulting in a field joint coating that has an outer diameter equal or close to the outer diameter of the parent coating 10. In examples where the first layer 102 forms an upstand, the second layer 104 may be formed to match the greater outer diameter created by the upstand in the first layer 102. Where the first layer 102 has an approximate hourglass shape, as in the example of FIG. 1, the second layer 104 may completely fill in the annulus formed at the middle section of the first layer 102.

The second layer 104 may be bonded to the first layer 102. For example, one or more pre-treatments (e.g., grinding and/or ionizing) may be applied to the outer surface of the first layer 102 prior to forming the second layer 104, in order to increase bonding between the layers 102, 104. In some examples, an intermediate adhesive layer (not shown) may be positioned between the first and second layers 102, 104.

In some examples, the second layer 104 may not be bonded to the first layer 102 but instead be free floating over the first layer 102 (e.g., able to flex and stretch relative to the first layer 102). The first layer 102 may provide sufficient water/corrosion resistance such that water seepage in between the first layer 102 and the free floating second layer 104 may be acceptable. The shape of the layers 102, 104 may also result in the second layer 104 being held in the annulus formed by the first layer 102 and hence relatively fixed in position (e.g., not sliding longitudinally along the field joint) even while being freely flexible over the first layer 102. The arrangement of the second layer 104 being free floating over the first layer 102 may provide the coated field joint with greater flexibility and bendability compared to the arrangement where the first and second layers 102, 104 are bonded to each other. On the other hand, bonding the first and second layer 102, 104 to each other may provide the coated field joint with greater mechanical strength.

Figure 2:
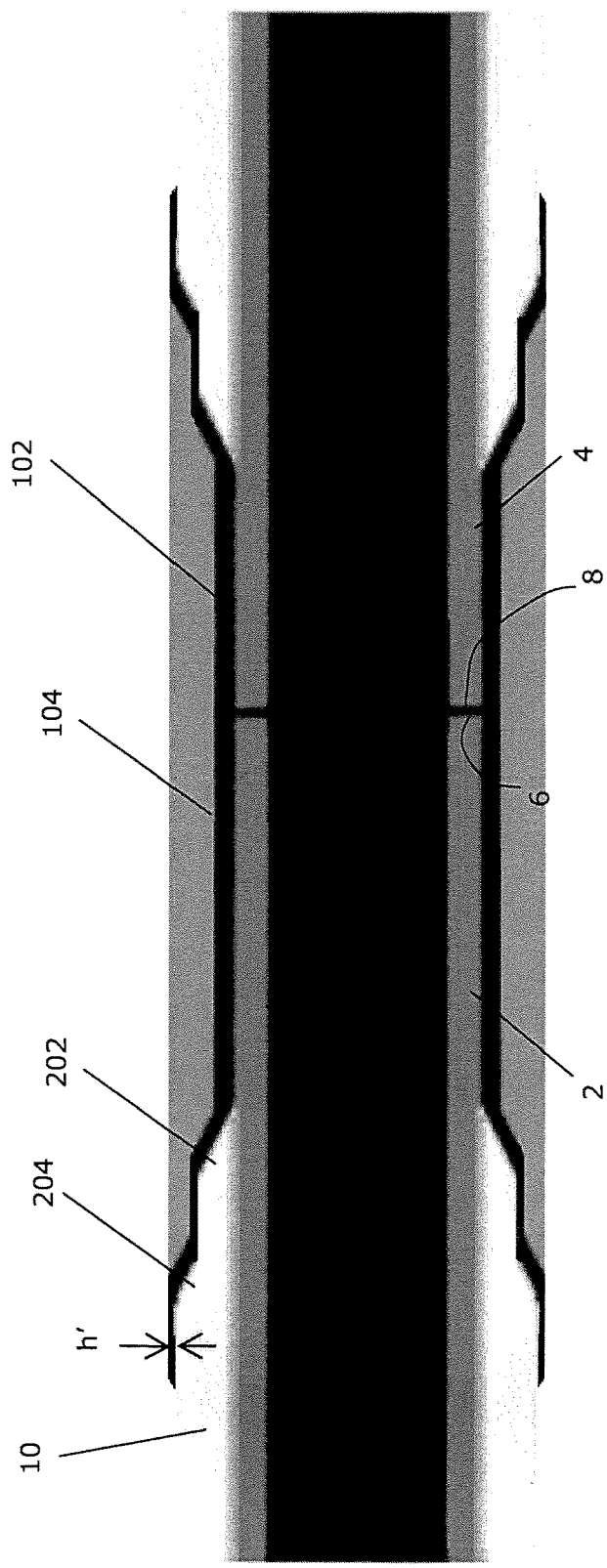
FIG. 2 shows a longitudinal cross-sectional view of another example coated field joint in accordance with an example of the present disclosure.
Figure 3:
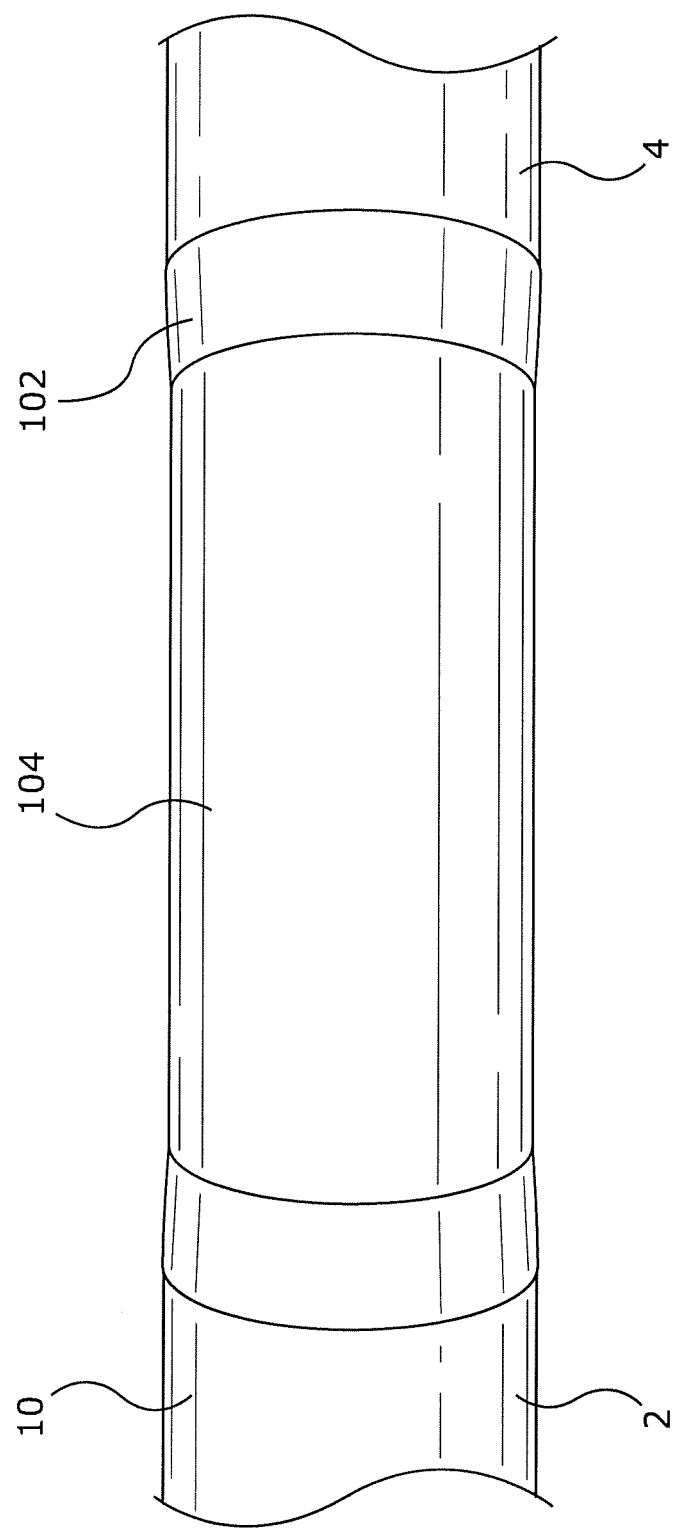
FIG. 3 shows a view of the outer surface of the example coated field joint of FIG. 2.

FIG. 2 shows a longitudinal cross-sectional view of another example coated field joint in accordance with an example of the present disclosure. FIG. 3 shows a view of the outer surface of this example coated field joint.

This example coated field joint may be similar to that of FIG. 1, with a difference being that the upstand has a height h' that is reduced compared to that shown in FIG. 1. For example, the upstand may have a height h' of about 5 mm or less (e.g., about 2 mm) or may be about 0 mm (i.e., the field joint coating is substantially flush with the parent coating 10). A coated field joint that has a reduced upstand or that is flush with the parent coating may enable easier handling prior to laying of the pipe, may help to reduce the risk of damage to laying equipment, may enable more pipe to be reeled and/or may enable a reduction in coating material used.

In this example, two cut backs 202, 204 are provided in the parent coating 10 prior to application of the first layer 102 of the field joint coating. The cut backs 202, 204 may be made using any suitable technique, such as by a grinding process or a lathing method, either at the manufacturing site or in the field. The cut backs 202, 204 may be configured as described in U.S. Provisional Patent Application No. 62/065,151 entitled "Flush Field Joint" and filed Oct. 17, 2014, for example. For example, the first cut back 202 may be at an angle between about 20° and about 45° (+/−5°), and in some examples may be about 30°+/−5° relative to the longitudinal axis of the field joint. The second cut back 204 may be also at an angle between about 20° and about 45° (+/−5°), and in some examples may be about 30°+/−5° relative to the longitudinal axis of the field joint. The angles of the cut backs 202, 204 may be the same or different. The second cut back 204 may be set back from the first cut back 202 by a distance (e.g., up to about 50 mm), forming a stepped profile.

The first and second layers 102, 104 of the field joint coating may be injection molded over the uncoated ends 6, 8 as well as the cut backs 202, 204. The first and second layers 102, 104 in the example of FIGS. 2 and 3 may be substantially similar to those described above with respect to FIG. 1.

The present disclosure may be particularly useful where the field joint coating is flush with or has a reduced upstand overlapping the parent coating. A reduced upstand (e.g., 5 mm or less) or a flush configuration may cause the field joint coating to have reduced adhesion to the parent coating than configurations having a conventional amount of upstand (e.g., 8 mm or greater). This may result in weakening at the field joint coating/parent coating interface and/or peeling of the field joint coating from the parent coating when the field joint is flexed or bent. The multi-layered field joint coating disclosed herein, being more flexible than conventional field joint coatings, may be able to withstand more flexing or bending, thus reducing the risk of failure at the field joint coating/parent coating interface due to poor adhesion.

Figure 4:
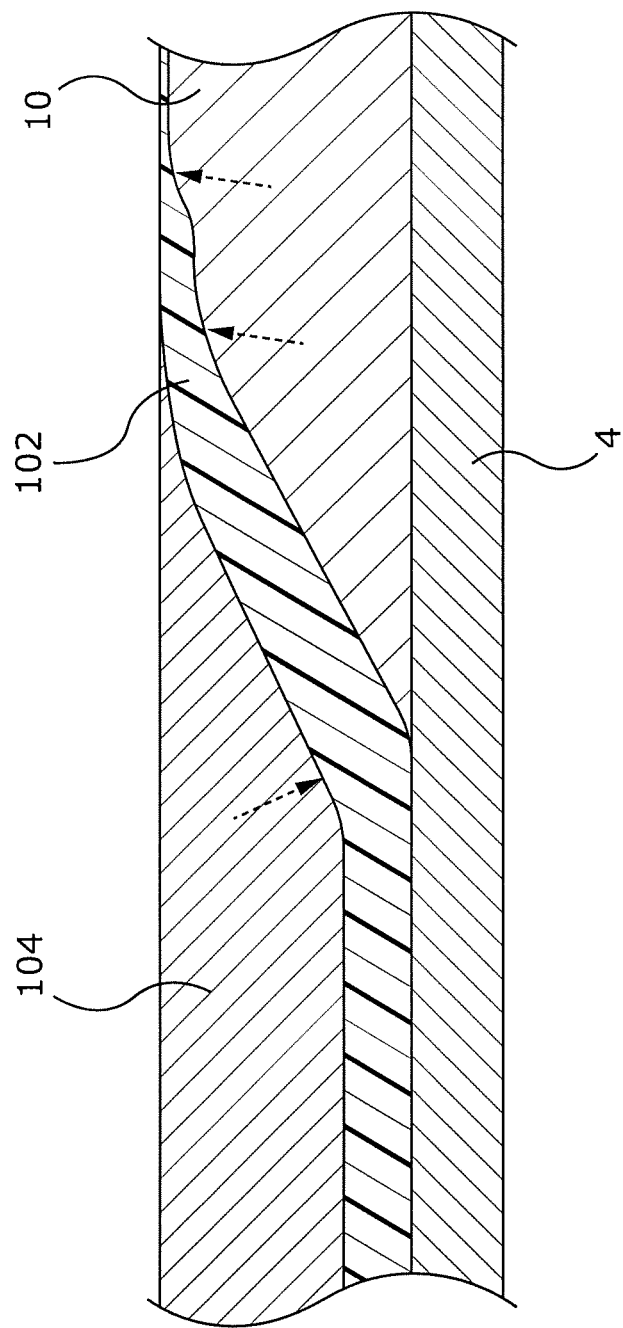
FIG. 4 shows a closeup of the longitudinal cross-sectional view of FIG. 2.

FIG. 4 shows a closeup of the longitudinal cross-sectional view of FIG. 2. In the example shown in FIG. 4, the first layer 102 is formed to have an increased thickness wherever it overlaps any angle in the uncoated field joint (e.g., the angle formed between the exposed uncoated pipe and the start of the parent coating 10). This increased thickness may be in the shape of a round radius where the first layer 102 overlaps an angle, for example at locations indicated by arrows in FIG. 4.

This increased radius may help to reduce or avoid stress concentration in the field joint coating, may help to ensure smoother transition between the materials and/or may enable easier flow of material during injection molding.

Even with the modification of increased radius instead of angles, the first layer 102 in FIG. 4 is still considered to correspond in profile to the exposed surfaces of the uncoated field joint, and still results in a generally hourglass shape for the first layer 102.

Figure 5:
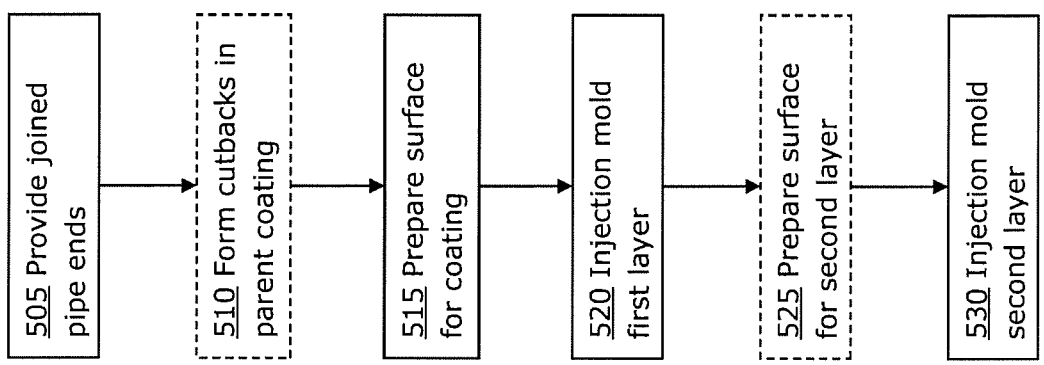
FIG. 5 shows a flowchart illustrating an example method for coating a field joint in accordance with an example of the present disclosure.

FIG. 5 shows a flowchart illustrating an example method for coating a typical field joint in accordance with an example of the present disclosure.

At 505, the method begins with the uncoated ends which have been joined (e.g., by welding on site).

Optionally, at 510 cut backs may be formed in the parent coating. This may be done in order to achieve a field joint coating that is flush with the parent coating or that has a reduced upstand, for example. In some examples, the cut backs may have been formed in the factory prior to transport to the field, in which case this step may be omitted. In examples where the field joint coating is to be formed with a conventional amount of upstand and cut backs do not need to be formed in the parent coating, this step may also be omitted.

At 515, the exposed surfaces of the uncoated field joint may be prepared for application of the field joint coating. This may include surface inspection and blasting, parent coating preparation, steel induction heating, application of an epoxy and adhesive layer, heating of the parent coating, and/or post-treatment inspection. For example, exposed surfaces may first be cleaned (e.g., using a solvent, such as xylene and/or by surface blasting). Exposed metal surfaces of the pipe sections in the vicinity of the welded field joint may be heated (e.g., using an induction heating coil), such as to a temperature in the range of about 70° C. to about 250° C., depending on what type of anti-corrosion coating or primer is used. A primer, which may improve binding of the field joint coating, may be applied to the heated or unheated metal surfaces. In some examples, the outer surfaces of the parent coating that will be covered by the field joint coating may be abraded (e.g., using a grinder), flame treated and/or coated with a primer/adhesive. A fusion bonded epoxy and adhesive layer may be applied. The entire area to be coated by the field joint coating may be flame treated and/or primed with a primer/adhesive. One or more of these pre-treatments may be used in combination. The pre-treatments may provide anti-corrosion protection and/or help the field joint coating to better bond to the exposed surfaces of the pipe sections and the parent coating.

At 520, the first layer of the field joint coating is injection molded over the exposed field joint. A mold may be positioned about the welded field joint and a portion of the parent coating and the material for the first layer (e.g., polypropylene) may be injected. The mold may be dimensioned to correspond to the profile of the exposed field joint (e.g., corresponding to the length and angle of the cut back(s) in the parent coating), such that the first layer will be formed to be relatively thin and conforming to the profile of the exposed field joint. The injection molding process may be carried out at a sufficient temperature and/or pressure to ensure that the material for the first layer fully fills in the mold and fully covers the exposed surfaces of the field joint and the portion of the parent coating enclosed by the mold. The mold may be removed after the first layer has set and/or cured. In some examples, the mold may be removed when the first layer is partly or mostly set and/or cured (e.g., at least the outer surface has set), and full setting and/or curing of the first layer may occur without the mold. Internal water cooling in the mold and back pressure may be used to assist in the molding process of the first layer.

After the mold is removed, the first layer may be further cooled (e.g., with water) to bring the temperature down to within the temperature tolerance of the second layer material (e.g., about 80° C. or lower). The first layer may be inspected and/or trimmed to ensure appropriate conditions for further coating.

Optionally, at 525, the outer surface of the first layer may be prepared in order to promote bonding between the first and second layers of the field joint coating. For example, grinding and/or ionizing of the outer surface of the first layer may be performed using suitable techniques (e.g., radiation heating, propane heating or air heating) to promote bonding with the second layer. In examples where a free floating (i.e., unbonded) second layer is desired, this step may be omitted.

In some examples, an adhesive layer or primer may be applied to the first layer to promote bonding between the first and second layers.

At 530, the second layer is injection molded over the first layer. A flexible mold different from the one used for the first layer may be wrapped around the first layer and the material for the second layer (e.g., polyurethane or an epoxy-urethane hybrid, such as the NEMO 1.1 material) may be injected until the material is flush with the upstand of the first layer (or flush with the parent coating in the case where there is no upstand). The injection molding process may be different from the injection process of the first layer. The mold may be removed after the second layer has sufficiently set and/or cured.

After the layers of the field joint coating have been applied and fully cured, a final inspection of the field joint coating may be performed.

Although the example method has been described with certain steps in a certain order, it should be understood that one or more steps may be omitted or varied in order. Other steps may be performed in addition to those described above. The example method may be performed entirely in the field or may be performed partly at another location (e.g., at a manufacturing site).

An example coated field joint with a two thermal insulation layer coating as disclosed herein was tested to ensure acceptable performance. The configuration tested used IMPP as the first layer and NEMO 1.1 as the second layer, with the field joint coating being flush with the parent coating.

In bend trials, the coated field joint test sample was tested according to a test where failures were typically observed at more than 50% frequency when testing other field joint designs. 10 bend trials were performed to a 9.75 m radius and on temperatures ranging from 1° C. to 15° C. The bending was performed at 2 different types of bend rigs and on 2 different pipe items (namely 10 inch thick walled pipes with 76 mm syntactic polypropylene (SPP) insulation and with 106 mm SPP insulation). No failures or other issues were observed during the bending or sectioning of the test samples.

Rollerbox testing was also carried out. About 2 hours after injection molding the field joint coating, a roll with 7.32 metric tons of pressure on a single v-shaped roller was passed over the coated field joint a total of 4 times. No permanent deformation of the coated field joint test sample could be observed during or after the test.

In tensioner testing, the coated field joint test sample was exposed to the pressures and friction it would be expected to experience when passing through the tensioner in a pipe-lay operation. No detrimental damage was observed to any part of the coated field joint test sample.

Thus, testing indicates that a coated field joint formed in accordance with an example of the present disclosure provides satisfactory performance.

In various examples, the present disclosure may provide a coated field joint that may benefit from properties of different materials used in the layers of the field joint coating. The first layer, which may comprise IMPP, may provide water/corrosion resistance and be able to withstand the elevated temperatures at the surface of the exposed pipe. The second layer, which may comprise a polyurethane or an epoxy-urethane material, may provide greater flexibility and insulation. For example, the NEMO 1.1 epoxy-urethane hybrid material, which may be used for the second layer, provides better insulation than IMPP, providing both a lower U-value as well as a longer expected cool down time. The NEMO 1.1 material also has a lower modulus than IMPP, resulting in the second layer being able to absorb much of the stresses that would otherwise be experienced by the first layer at the interface with the parent coating. This flexibility may be further increased by leaving the second layer free floating over the first layer. Further, the exothermic reaction of the NEMO 1.1 material during application and curing typically reaches a maximum of 90° C. and typically only exhibits a shrinkage of 3-4%, compared to a shrinkage of typically 10-12% for IMPP. By using the NEMO 1.1 material to form the majority of the field joint coating, this may remove or reduce internal stresses as well as the stresses the parent coating is exposed to.

The embodiments of the present disclosure described above are intended to be examples only. The present disclosure may be embodied in other specific forms. Alterations, modifications and variations to the disclosure may be made without departing from the intended scope of the present disclosure. While the system, devices and processes disclosed and shown herein may comprise a specific number of elements/components, the systems, devices and assemblies could be modified to include addition or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and subranges within disclosed ranges are also disclosed. The subject matter described herein intends to cover and embrace all suitable changes in technology. All references mentioned are hereby incorporated by reference in their entirety.

What is claimed is:

1. A method of coating a field joint joining uncoated ends of two pipe sections, each pipe section being coating with a parent coating and having at least one uncoated end, the method comprising:
    injection molding a first thermal insulation layer of a field joint coating over at least the uncoated ends and a portion of the parent coating of each pipe section, the first layer comprising a first material; and
    injection molding a second thermal insulation layer of the field joint coating over the first layer, the second layer comprising a second material having a greater flexibility than the first material and having a lower maximum operating temperature than the first material.

2. The method of claim 1 wherein the second layer forms a majority of the field joint coating, in volume.

3. The method of claim 1 wherein the first material is an injection molded polypropylene material.

4. The method of claim 1 wherein the second material is an epoxy-urethane hybrid material.

5. The method of claim 1 wherein the first layer has a profile substantially matching an outer profile of exposed surfaces of the uncoated field joint.

6. The method of claim 4 wherein the first layer has an increased thickness in a region where the first layer overlays an angle in the exposed surfaces of the uncoated field joint.

7. The method of claim 6 wherein the increased thickness is an increase in radius in the range of about 30-50 mm.

8. The method of claim 1 wherein the first and second layers of the field joint coating are formed to create an upstand that is less than or equal to about 5 mm.

9. The method of claim 8 wherein the upstand is about 0 mm.

10. The method of claim 1 wherein:
    injection molding the first layer comprises positioning a first mold about the uncoated ends and a portion of the parent coating at the field joint, the first mold corresponding to an outer profile of exposed surfaces of the uncoated field joint, and injection molding the first material into the first mold; and
    injection molding the second layer comprises positioning a second mold about the first layer, and injection molding the second material into the second mold.

11. The method of claim 1 wherein the second layer is free floating over the first layer.

12. The method of claim 1 further comprising pre-treating outer surfaces of the first layer prior to injection molding the second layer, to promote bonding between the first and second layers.

13. The method of claim 1 wherein the uncoated ends are coated with a corrosion resistant coating before injection molding the first thermal insulation layer.

14. The method of claim 13 wherein the corrosion resistant coating is a fusion bonded epoxy (FBE) coating.

* * * * *